(12) United States Patent
Maeda (10) Patent No.: US 8,861,040 B2
(45) Date of Patent: Oct. 14, 2014

(54) IMAGE-READING DEVICE AND COMPUTER-READABLE STORAGE MEDIUM CONFIGURED TO DETERMINE DOCUMENT EDGE FROM PLURALITY OF CANDIDATE EDGE POINTS

(75) Inventor: Takashi Maeda, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 187 days.

(21) Appl. No.: 13/549,029

(22) Filed: Jul. 13, 2012

(65) Prior Publication Data

US 2013/0083365 A1   Apr. 4, 2013

(30) Foreign Application Priority Data

Sep. 30, 2011  (JP) ................................. 2011-217056

(51) Int. Cl.
*H04N 1/40*   (2006.01)
*H04N 1/00*   (2006.01)

(52) U.S. Cl.
CPC ....... *H04N 1/00737* (2013.01); *H04N 1/00745* (2013.01); *H04N 1/00694* (2013.01); *H04N 1/00702* (2013.01); *H04N 2201/0081* (2013.01)
USPC ........................................................ 358/449

(58) Field of Classification Search
CPC ....... G06T 7/0079; G06T 7/403; G06T 7/602; H04N 1/00748; H04N 1/00745

USPC .......................................................... 358/449
See application file for complete search history.

(56) References Cited

U.S. PATENT DOCUMENTS

| 2009/0180155 | A1  | 7/2009  | Kato et al. |
| 2009/0185240 | A1  | 7/2009  | Kato et al. |
| 2010/0149603 | A1* | 6/2010  | Maeda ........................ 358/449 |
| 2010/0284043 | A1  | 11/2010 | Hattori |

FOREIGN PATENT DOCUMENTS

| JP | 2003-189065 A | 7/2003 |
| JP | 2004-120425 A | 4/2004 |
| JP | 2005005837 A  | 1/2005 |
| JP | 2009164807 A  | 7/2009 |
| JP | 2010-118911 A | 5/2010 |
| JP | 2010-263434 A | 11/2010 |

OTHER PUBLICATIONS

Notice of Reasons for Rejection issued in corresponding Japanese Patent Application No. 2011-217056, mailed Sep. 12, 2013.

* cited by examiner

*Primary Examiner* — Barbara Reinier
(74) *Attorney, Agent, or Firm* — Banner & Witcoff, Ltd.

(57) ABSTRACT

An image-reading device may include a conveyor, a reading unit, and a control device. The control device may be configured to extract feature points from an area between a first edge and a line, obtain the density of the extracted feature points, and compare the density to a threshold. The control device may be further configured to identify the first edge as a document leading edge or a document trailing edge based on the comparison result.

22 Claims, 10 Drawing Sheets

IMAGE-READING DEVICE AND COMPUTER-READABLE STORAGE MEDIUM CONFIGURED TO DETERMINE DOCUMENT EDGE FROM PLURALITY OF CANDIDATE EDGE POINTS

CROSS REFERENCE TO RELATED APPLICATION

This application claims priority from Japanese Patent Application No. 2011-217056, filed on Sep. 30, 2011, the entire subject matter of which is incorporated herein by reference.

TECHNICAL FIELD

The disclosure relates to a technique for identifying an edge of a document based on read data obtained by reading the document.

BACKGROUND

An image-reading device detects a position of an edge of a document in read data obtained by which an image sensor reads the document being conveyed by an automatic document feeder ("ADF"). For example, while moving a detection line from one side to the other side along a main-scanning direction, the image-reading device repeatedly detects, on the detection line extending along a sub-scanning direction (a document conveying direction), a candidate edge point having a pixel value that is different from a pixel value of pixels surrounding the candidate edge point by a threshold value or greater. Then, the image-reading device obtains an approximate straight line based on the detected candidate edge points and identifies the position of the edge of the document.

SUMMARY

According to the known technique, however, the following problems may occur when a distance between documents being successively conveyed is smaller, for example. A trailing edge of a preceding document may be erroneously detected in an attempt to detect a leading edge of a target document. A leading edge of a following document may be erroneously detected in an attempt to detect a trailing edge of a target document.

Embodiments provide for a technique for identifying a detected edge as a document leading edge or a document trailing edge.

Aspects of the disclosure relate to an image-reading device which may include a conveyor, a reading unit, and a control device. The control device may be configured to extract feature points from an area between a first edge and a line, obtain the density of the extracted feature points, and compare the density to a threshold. The control device may be further configured to identify the first edge as a document leading edge or a document trailing edge based on the comparison result.

The one or more aspects of the disclosure may be accomplished in various manners, such as image-reading devices, terminal devices, document edge detecting methods, computer programs for implementing functions of these devices or steps of the methods, or computer-readable storage medium storing the computer programs.

According to the one or more aspects of the disclosure, the detected edge may be identified as a document leading edge or a document trailing edge.

BRIEF DESCRIPTION OF THE DRAWINGS

For a more complete understanding of the present disclosure, needs satisfied thereby, and the objects, features, and advantages thereof, reference now is made to the following description taken in connection with the accompanying drawings.

DETAILED DESCRIPTION

One or more aspects of an embodiment are described in detail with reference to FIGS. 1-9.

Figure 1:
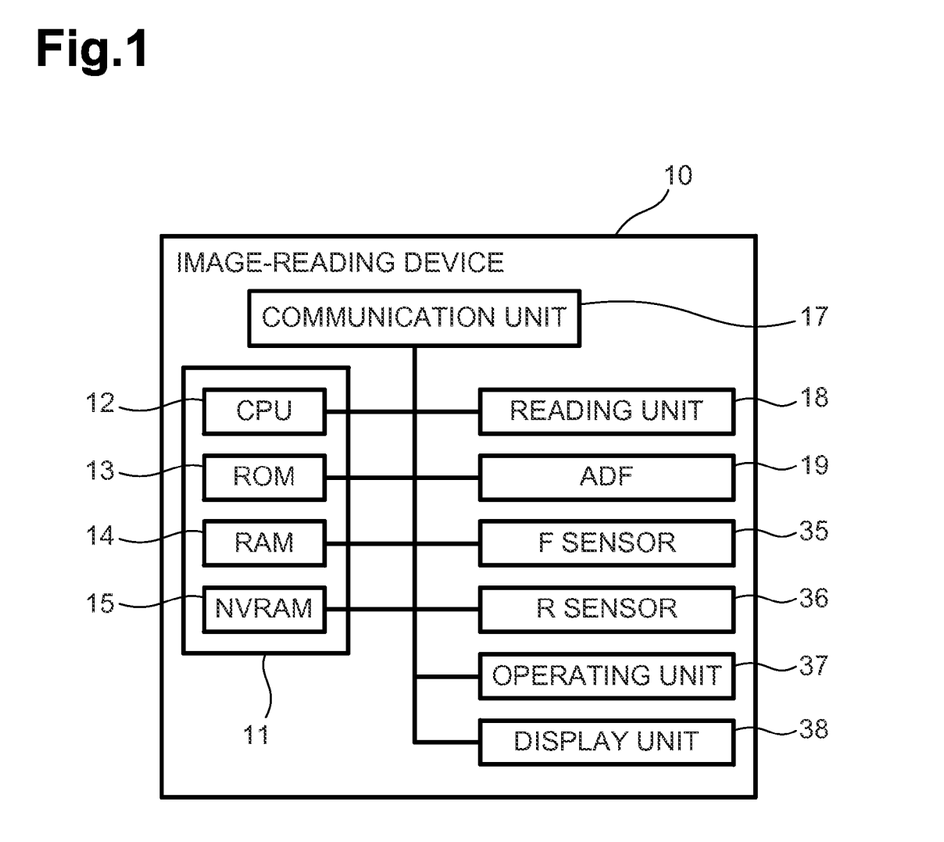
FIG. 1 is a schematic block diagram depicting an electric configuration of an image-reading device in an embodiment according to one or more aspects of the disclosure.

As shown in FIG. 1, an image-reading device 10 may comprise a control device 11, a communication unit 17, a reading unit 18, an automatic document feeder ("ADF") 19, an F sensor 35, an R sensor 36, an operating unit 37, and a display unit 38.

Control device 11 may comprise an application-specific integrated circuit ("ASIC"), for example. Control device 11 may further comprise a central processing unit ("CPU") 12, a read-only memory ("ROM") 13, a random-access memory ("RAM") 14, and a nonvolatile RAM ("NVRAM") 15. ROM 13 may store control programs for performing various functions of image-reading device 10, e.g., ADF reading process. CPU 12 may be configured to control functions of each unit of image-reading device 10 in accordance with the programs read from ROM 13. RAM 14 may be a volatile memory used as a workspace for CPU 12. NVRAM 15 may be configured to store read data of a document or various settings, for example.

Communication unit 17 may comprise an interface, e.g., Universal Serial Bus ("USB") or local-area network ("LAN"), and may be configured to allow image-reading device 10 to perform communication with an external device.

Figure 2:
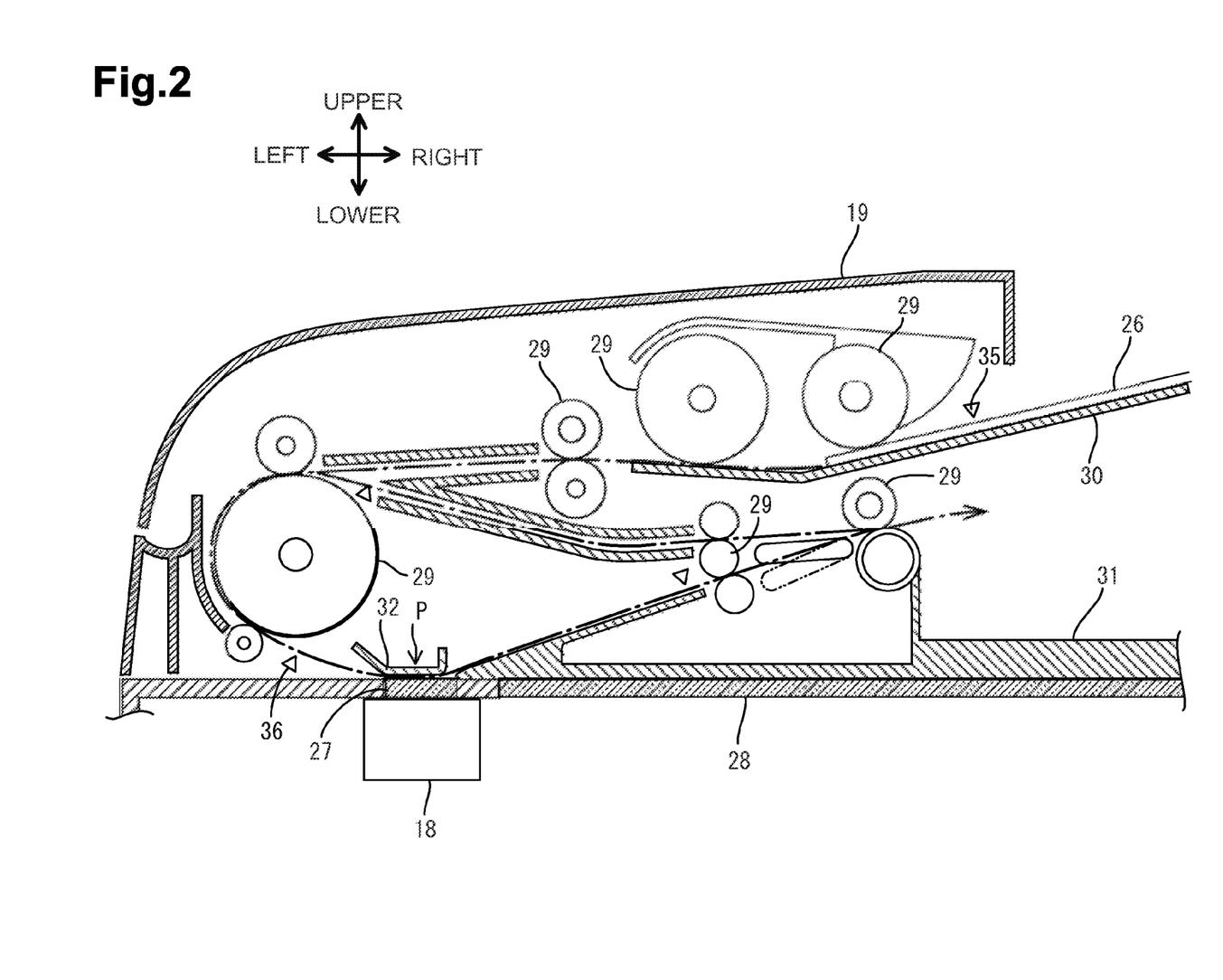
FIG. 2 is a partial enlarged sectional view depicting the image-reading device in the embodiment according to one or more aspects of the disclosure.

As depicted in FIG. 2, reading unit 18 may comprise an image sensor, e.g., contact image sensor ("CIS"), which may be configured to optically read a document 26. Reading unit 18 may be disposed below a pair of platen glasses 27, 28 that may be disposed in an upper portion of image-reading device 10.

ADF 19 may be disposed above platen glasses 27, 28. ADF 19 may be configured to feed one or more documents 26, from a document tray 30 and discharge documents 26 onto a discharge tray 31 via a reading position P. Reading unit 18 may be configured to read line by line a surface of each document 26 along a main-scanning direction (a direction perpendicular to the surface of the drawing sheet of FIG. 2). Further, reading unit 18 may configured to generate read data of each document 26 and output the generated read data to control device 11.

A document presser 32 may be disposed above platen glass 27 such that a lower surface of document presser 32 may face an upper surface of platen glass 27. Reading position P may be defined between platen glass 27 and document presser 32. The lower surface of document presser 32 may be uniformly white and may be read by reading unit 18 when reading is performed while a document 26 is absent at reading position P. Nevertheless, in other embodiments, for example, the lower surface of document presser 32 may be uniformly black or other colors, or not uniformly colored.

F sensor 35 may be configured to sense the presence or absence of one or more documents 26 placed on document tray 30 and output a detection signal corresponding to the presence or absence of one or more documents 26 on document tray 30. R sensor 36 may be disposed slightly upstream of reading position P in a document conveying direction. R sensor 36 may be configured to sense the presence or absence of a document 26 at a position and output a detection signal corresponding to the presence or absence of document 26 at the position. Photosensitive sensors or contact-type sensors including actuators may be adopted to F sensor 35 or R sensor 36.

Operating unit 37 depicted in FIG. 1 may comprise a plurality of buttons and may be configured to accept instruction inputs from a user. Display unit 38 (an example of notifying unit) may comprise a display and a lamp, for example, and may be configured to display various messages or setting screens.

Figure 3:
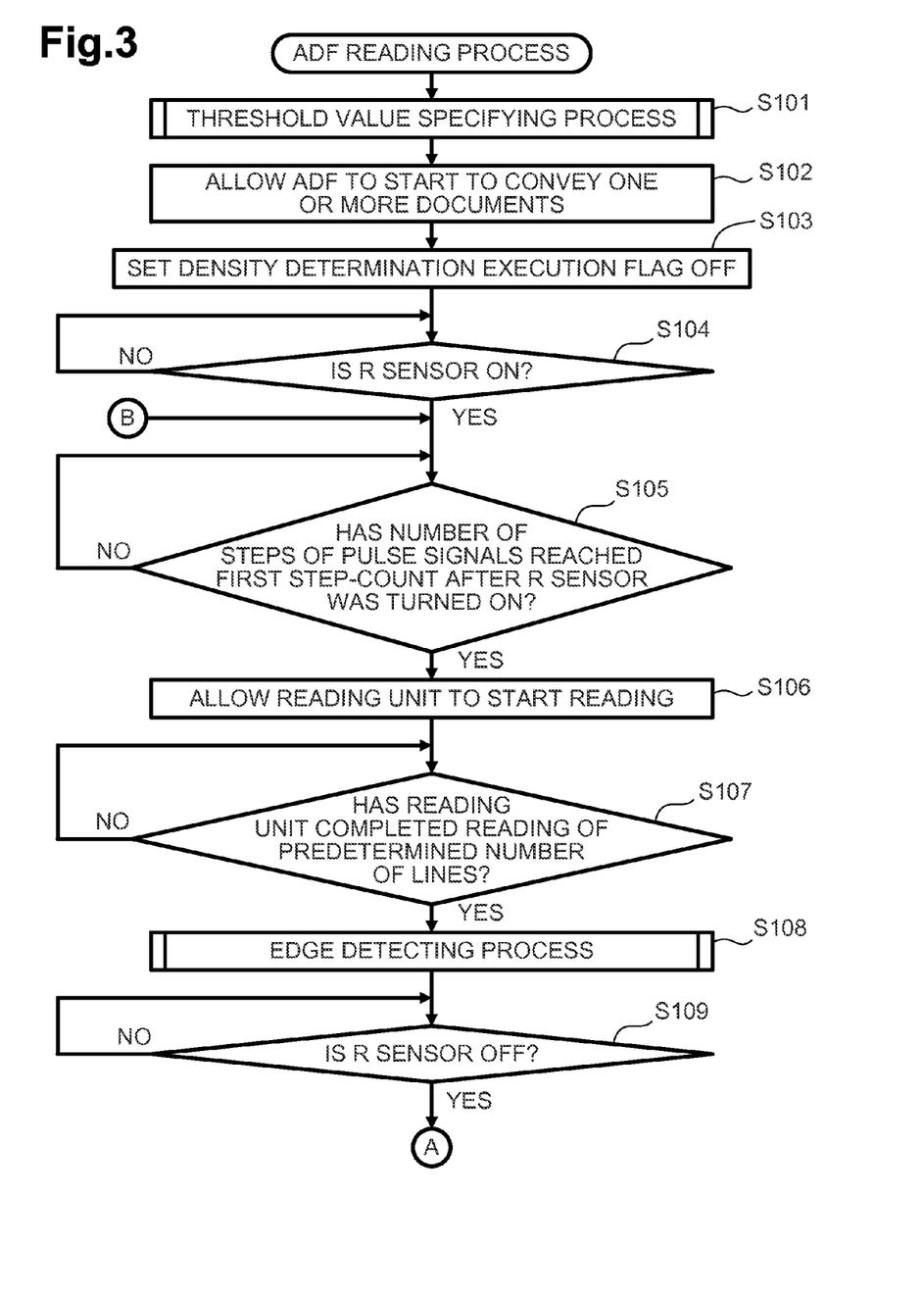
FIG. 3 is a flowchart depicting an ADF reading process in the embodiment according to one or more aspects of the disclosure.
Figure 4:
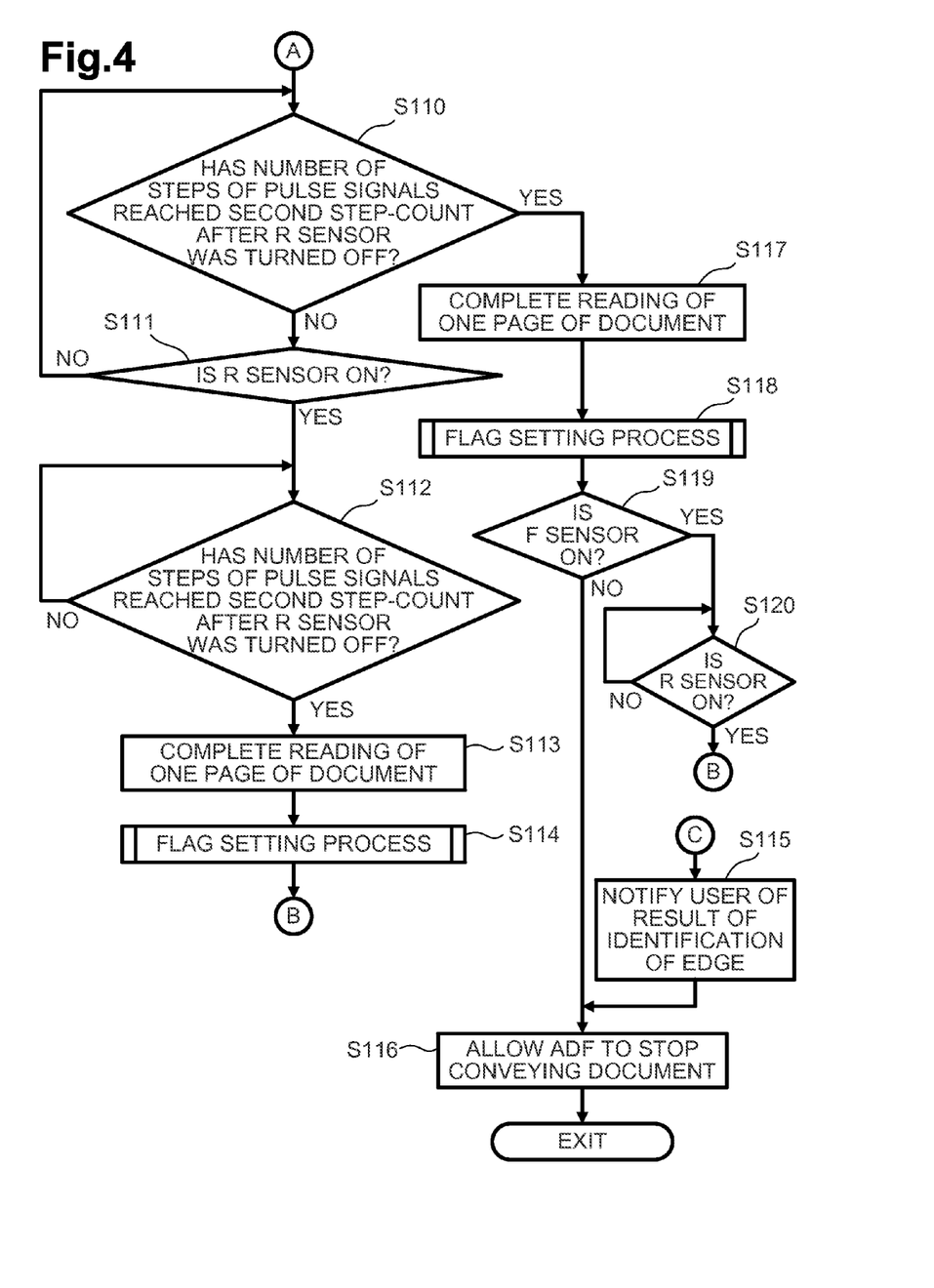
FIG. 4 is a continuation of the flowchart depicting the ADF reading process of FIG. 3 in the embodiment according to one or more aspects of the disclosure.
Figure 5:
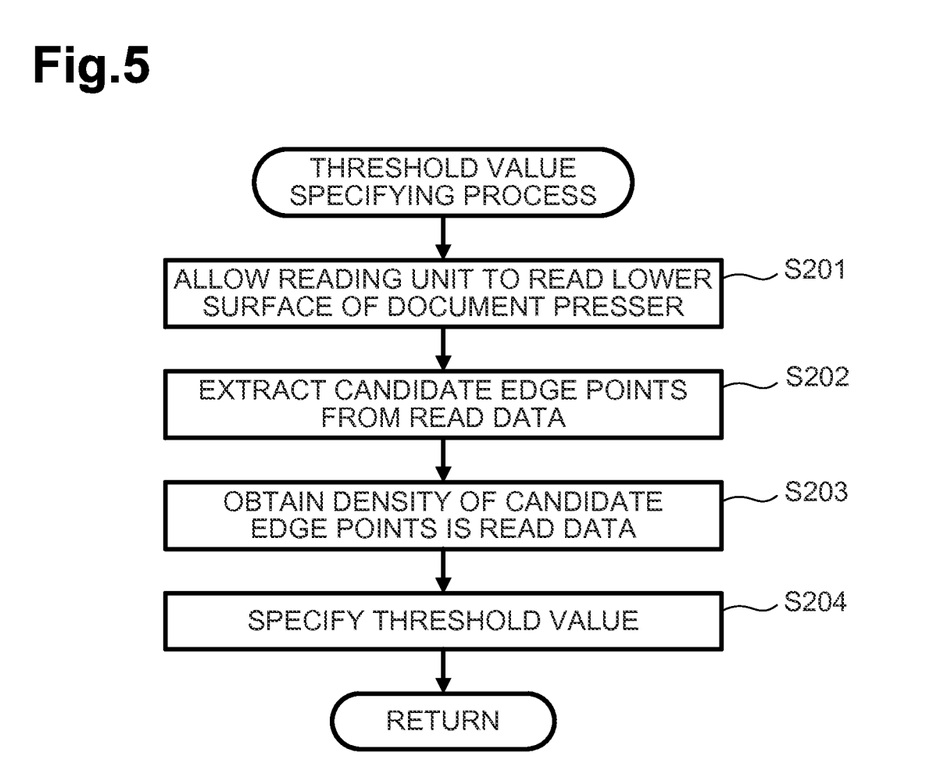
FIG. 5 is a flowchart depicting a threshold value specifying process in the embodiment according to one or more aspects of the disclosure.
Figure 6:
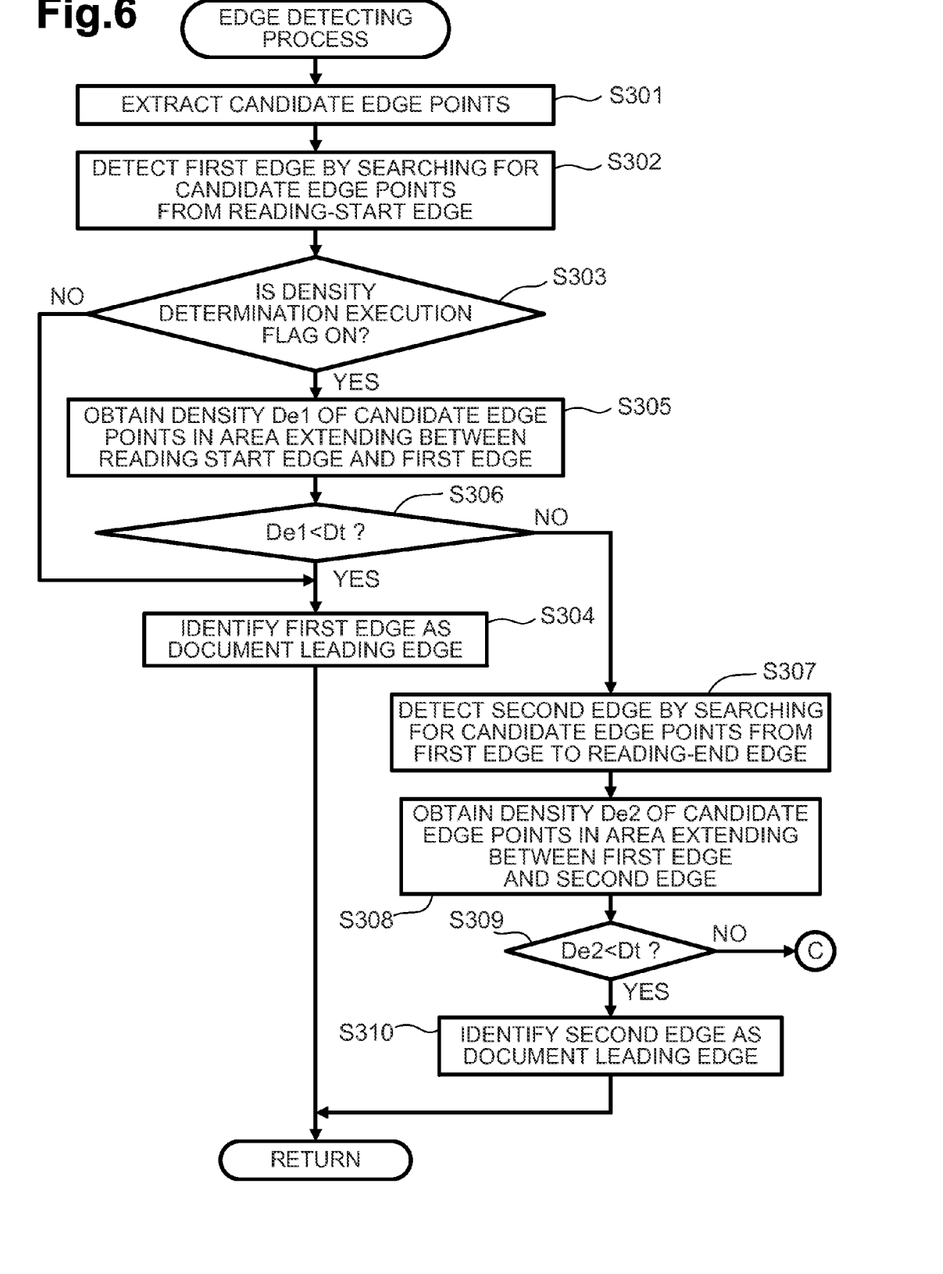
FIG. 6 is a flowchart depicting an edge detecting process in the embodiment according to one or more aspects of the disclosure.
Figure 7:
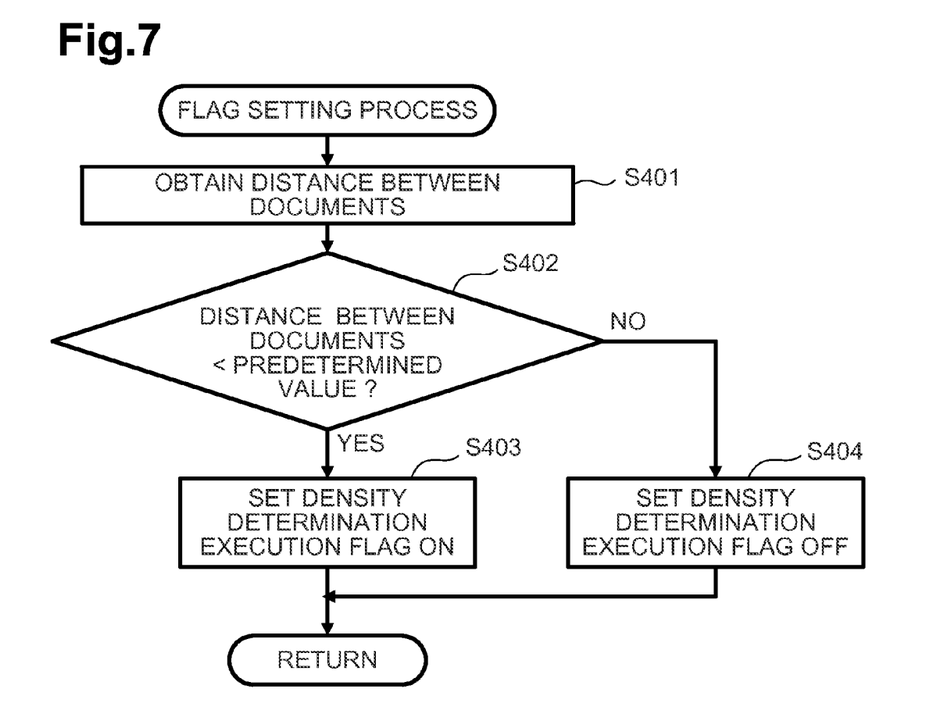
FIG. 7 is a flowchart depicting a flag setting process in the embodiment according to one or more aspects of the disclosure.

The ADF reading process is described below with reference to FIGS. 3 to 7. In the ADF reading process, a document 26 fed by ADF 19 may be read. FIGS. 3 and 4 are flowcharts depicting a main routine of the ADF reading process. FIG. 5 is a flowchart depicting a threshold value specifying process that is a subroutine of the ADF reading process. FIG. 6 is a flowchart depicting an edge detecting process that is a subroutine of the ADF reading process. FIG. 7 is a flowchart depicting a flag setting process that is a subroutine of the ADF reading process.

The ADF reading process may start when the user places one or more documents 26 on document tray 30 and inputs an instruction to start reading through operating unit 37. Upon start of the ADF reading process, CPU 12 may perform the threshold value specifying process for specifying a threshold value Dt to be used in a density determination (step S101).

Upon start of the threshold value specifying process depicted in FIG. 5, CPU 12 may allow reading unit 18 to read the lower surface of document presser 32 (step S201). The number of lines to be read during reading of the lower surface of document presser 32 may be equal to the number of lines to be read during reading of a detection area 40 in the edge detecting process (described later). CPU 12 may obtain read data including an image having the same area as detection area 40.

Then, CPU 12 may extract candidate edge points from the read data obtained by reading the lower surface of document presser 32 (step S202). Each candidate edge point (an example of feature point) may represent a location of a candidate pixel for an edge 26A of a document 26 and may be extracted by using the known edge point extraction technique. For example, an edge enhancement filter may be applied to the read data to distinguish a difference in pixel value between a target pixel and pixels surrounding the target pixel. Then, binarization may be performed. In the binarization, when the pixel value of the target pixel is greater than or equal to a predetermined threshold value, the pixel value of the target pixel may be set to "1 (one)", and when the pixel value of the target pixel is smaller than the predetermined threshold value, the pixel value of the target pixel may be set to "0 (zero)". Through such an image processing, the candidate edge points may be extracted.

One or more candidate edge points may be extracted from the read data obtained by reading the lower surface of document presser 32 under the influence of noise, e.g., foreign matter, dirt or others adhering to platen glass 27 or document presser 32, although the read data may not include an edge 26A of an actual document 26. The number of candidate edge points to be extracted may vary depending on one or more of a dirt level of the lower surface of document presser 32 and age deterioration caused in reading characteristics of reading unit 18 (e.g., deterioration of light-receiving element).

Then, CPU 12 may obtain a density of the candidate edge points in the read data, i.e., the number of candidate edge points existing per unit area (step S203). CPU 12 may specify a threshold value Dt based on the obtained density of the candidate edge points (step S204). Threshold value Dt may be a median value between the density of the candidate edge points in the area of the read data of the lower surface of document presser 32 and a density of the candidate edge points in the area of the read data of document 26. Threshold value Dt may be used to distinguish between these densities in the density determination described later.

More specifically, for example, threshold value Dt may be a value obtained by adding a predetermined value to the density of the candidate edge points obtained in step S203 or may be a value obtained by multiplying the density of the candidate edge points obtained in step S203 by a predetermined value that may be one or more greater value, e.g., two. Threshold value Dt may become greater as the density of the candidate edge points becomes higher. After specifying threshold value Dt, CPU 12 may exit the threshold value specifying process.

After specifying threshold value Dt in step S101 of FIG. 3, CPU 12 may allow ADF 19 to convey one or more documents 26 placed on document tray 30 (step S102). Then, CPU 12 may set a density determination execution flag off (step S103). The density determination execution flag may indicate whether the density determination is performed.

CPU 12 may determine whether R sensor 36 is on (step S104). When R sensor 36 is not on (step S104:NO), CPU 12 may repeat the determination in step S104 until CPU 12 determines that R sensor 36 is turned on. When R sensor 36 is turned on by a leading edge of a first document 26 that reached the location of R sensor 36 (step S104:YES), CPU 12 may determine whether the number of steps of pulse signals supplied to a stepping motor for driving ADF 19 has reached a predetermined first step-count after R sensor 36 was turned on (step S105). When the number of steps of pulse signals has not reached the first step-count (step S105:NO), the routine may wait until the number of steps of pulse signals reaches the first step-count.

A reading start timing may be defined by the first step-count. The first step-count may be specified such that the number of steps of pulse signals may reach the first step-count when a leading edge of a document 26 reaches a position at a predetermined distance, e.g., 3 mm, upstream from reading position P in the document conveying direction. When the number of steps of pulse signals has reached the first step-count (step S105:YES), CPU 12 may allow reading unit 18 to start reading (step S106).

CPU 12 may determine whether reading unit 18 has completed the reading of the predetermined number of lines that may correspond to the reading of detection area 40 (described later) (step S107). When reading unit 18 has not completed the reading of the predetermined number of lines (step S107: NO), the routine waits until reading unit 18 completes the reading of the predetermined number of lines. When reading unit 18 has completed the reading of the predetermined number of lines (step S107:YES), CPU 12 may perform the edge detecting process for detecting an edge 26A of document 26.

Figure 8:
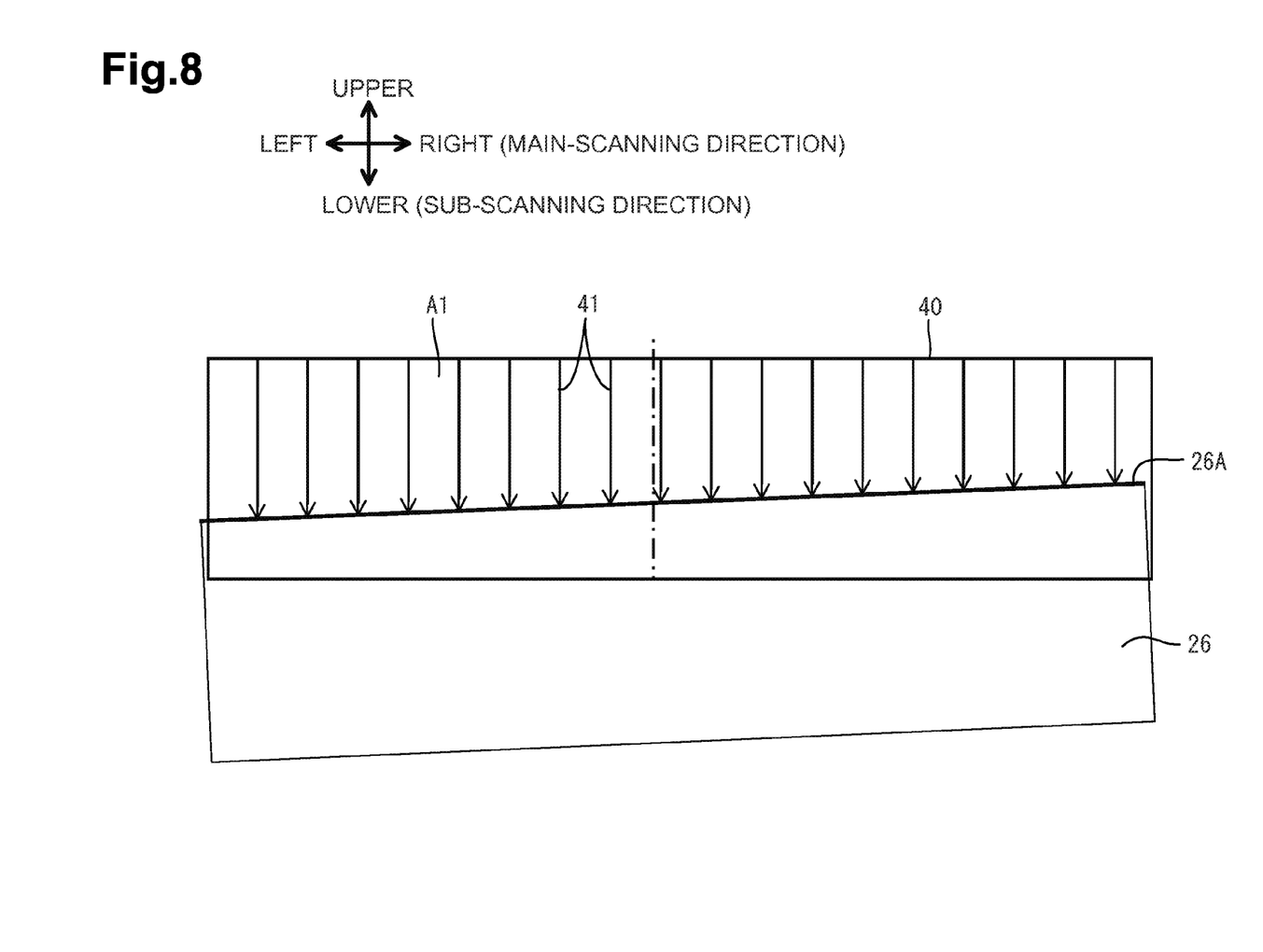
FIG. 8 is an explanatory diagram depicting a positional relationship between a detection area and a single document in the embodiment according to one or more aspects of the disclosure.
Figure 9:
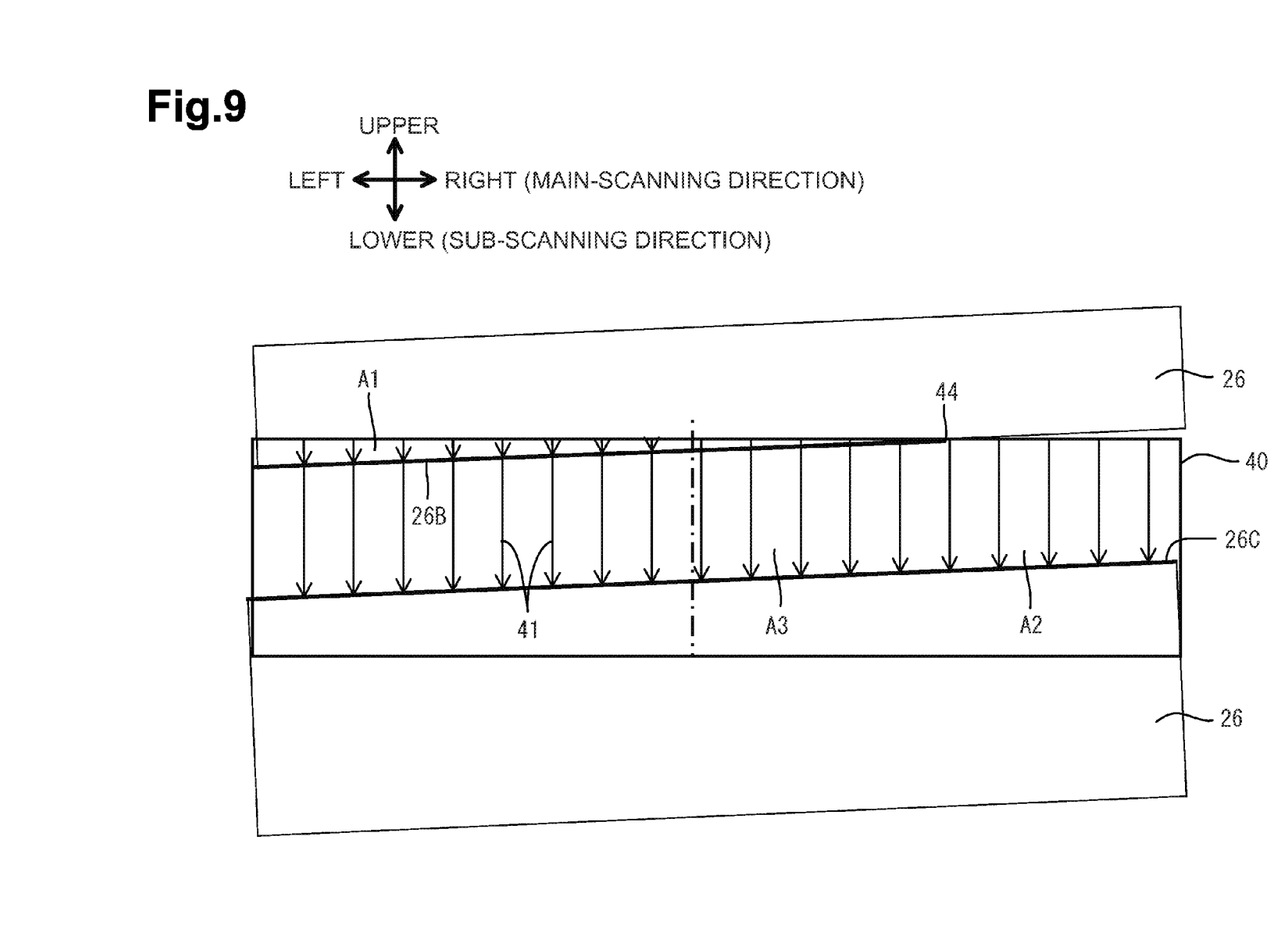
FIG. 9 is an explanatory diagram depicting a positional relationship between a detection area and two documents in the embodiment according to one or more aspects of the disclosure.

Here, FIG. 8 depicts an illustrative case where detection area 40 includes a leading edge of a document 26. FIG. 9 depicts an illustrative case where detection area 40 includes a trailing edge of a first document 26 and a leading edge of a second document 26. As depicted in FIGS. 8 and 9, detection area 40 may include at least a leading edge 26A, 26C, which may be a detection target, of document 26. Documents 26 may be read without being skewed in most cases although FIGS. 8 and 9 depict one or more documents 26 skewed with respect to a sub-scanning direction that may be the document conveying direction.

Upon start of the edge detecting process of FIG. 6, CPU 12 may extract candidate edge points by performing, for example, the edge enhancement and the binarization on the read data of detection area 40 (step S301). More candidate edge points may be extracted from the read data of document 26 than the read data of the lower surface of document presser 32 because document 26 has asperities on the surface.

Then, CPU 12 may detect a first edge (step S302). More specifically, as depicted in FIG. 8, a plurality of straight lines that may be distant from each other in the main-scanning direction and extend in the sub-scanning direction may be used as detection lines 41. The detection lines 41 may also be referred to as parallel paths. The upper side and lower side of the drawing sheet of FIG. 8 may be defined as the upper side and lower side, respectively, of read data. The upper side and lower side of read data may be also referred to as a reading-start side and a reading-end side in the sub-scanning direction. These directions may be also used in like drawings. CPU 12 may search for each of the extracted candidate edge points along each of detection lines 41 in detection area 40 beginning from a pixel located at an end of detection line 41 on the reading-start side (an upper end in FIGS. 8 and 9) toward the other end of detection line 41 on the reading-end side (a lower end in FIGS. 8 and 9). Then, CPU 12 may obtain an approximate straight line based on the candidate edge points found first on the respective detection lines 41 and detect the approximate straight line as a first edge.

As described above, the candidate edge points may be extracted from an entire image of document 26 and the image of the lower surface of document presser 32 as well as an area surrounding actual edge 26A. However, the most of candidate edge points may be located along actual edge 26A of document 26. Therefore, the first edge may be a substantially straight line extending along edge 26A of document 26. When a candidate edge point that is located far from the other candidate edge points detected on detection line 41, such a point may be identified as noise and ignored. Then, CPU 12 may continue to search for another candidate edge point on detection line 41.

Then, CPU 12 may determine whether the density determination execution flag is on (step S303). When the density determination execution flag is on (step S303:YES), CPU 12 may identify the first edge as leading edge 26A of document 26 of the detection target (step S304). Then, CPU 12 may store the detection result and exit the edge detecting process. The density determination execution flag may be set to off in step S103 of FIG. 3 when CPU 12 detects first document 26. Therefore, CPU 12 may identify the detected first edge as edge 26A of the detection target without performing the density determination as described above.

Upon end of the edge detecting process in step S108 of FIG. 3, CPU 12 may determine whether R sensor 26 is off (step S109). When R sensor is not off (step S109:NO), the routine may wait until R sensor 36 is turned off When a trailing edge of document 26 passes the location of R sensor 36, CPU 12 may determine that R sensor 36 is off (step S109:YES). Then, CPU 12 may determine whether the number of steps of pulse signals has reached a second step-count after R sensor 36 was turned off (step S110 in FIG. 4).

A reading end timing may be defined by the second step-count. The second step-count may be specified such that the number of steps of pulse signals may reach the second step-count when a trailing edge of document 26 reaches a position at a predetermined distance, e.g., 3 mm, downstream from reading position P in the document conveying direction. When the number of steps of pulse signals has not reached the second step-count after R sensor 36 was turned off (step S110:NO), CPU 111 may determine whether R sensor 36 is turned on by a second document 26 that has reached the location of R sensor 36 (step S111).

When R sensor 36 is not turned on (step S111:NO), the routine may move back to step S110 and CPU 12 may repeat step S110. When R sensor 36 is turned on by a leading edge of second document 26 that has reached the location of R sensor 36 before the number of steps of pulse signals reaches the second step-count after R sensor 36 was turned off (step S111:YES), CPU 12 may determine whether the number of steps of pulse signals has reached the second step-count after R sensor 36 was turned on (step S112). When the number of steps of pulse signals has not reached the second step-count (step S112:NO), the routine may wait until the number of steps of pulse signals reaches the second step-count.

When the number of steps of pulse signals has reached the second step-count (step S112:YES), CPU 12 may complete the reading of one page of first document 26 (step S113). Then, CPU 12 may perform the flag setting process for setting a value of the density destination execution flag (step S114).

Upon start of the flag setting process of FIG. 7, CPU 12 may obtain a distance between documents that may be being successively conveyed (step S401). The distance between documents may be obtained based on a conveying speed of document 26 and an elapsed time between when R sensor 36 is turned off and when R sensor 36 is then turned on. The distance between documents may be determined based on a length of document 26 depending on the configuration of ADF 19. In this case, an elapsed time between when R sensor 36 is turned off and when R sensor 36 is then turned on may be obtained. Then, a length of document 26 may be obtained based on the obtained elapsed time and a distance between documents may be obtained based on the obtained length of document 26. In other embodiments, for example, the user may input a document size through operating unit 37 and obtain a distance between documents based on the document size.

CPU 12 may determine whether the distance between documents is smaller than a predetermined value (step S402). When the distance between documents is smaller than the predetermined value (step S402:YES), detection area 40 may include a trailing edge 26B of first document 26 as depicted in FIG. 9. Therefore, CPU 12 may set the density determination execution flag on (step S403) and exit the flag setting process. When the distance between documents is greater than or equal to the predetermined value (step S402:NO), detection area 40 may not include trailing edge 26B of first document 26. Therefore, CPU 12 may set the density determination execution flag off (step S404) and exit the flag setting process.

After ending the flag setting process in step S114 of FIG. 4, the routine may move back to step S105 of FIG. 3. Then, CPU 12 may allow reading unit 18 to start reading of a second document 26 (step S106). After obtaining read data of detection area 40 (step S107:YES), CPU 12 may perform the edge detecting process (step S108).

In the edge detecting process of FIG. 6, as described above, CPU 12 may extract candidate edge points from read data of detection area 40 (step S301) and detect a first edge (step S302). After detecting the first edge, CPU 12 may determine whether the density determination execution flag is on (step S303). When the distance between documents is smaller than the predetermined value and the density determination execution flag is on (step S303:YES), CPU 12 may perform the density determination to identify an edge, which was detected based on the density of the candidate edge points, as a document leading edge or a document trailing edge (steps S305-S310, and S304).

When the edge determination execution flag is on, CPU 12 may obtain a density De1 of candidate edge points in an area located between a reading-start edge of detection area 40 and the first edge included in detection area 40 (step S305).

As depicted in FIG. 8, when detection area 40 includes a leading edge of a single document 26, a single straight line may be detected as a first edge. In this case, the area located between the reading-start edge and the first edge may correspond to a substantially trapezoidal area (or a rectangular area when document 26 is not skewed) in which the candidate edge points were detected along respective detection lines 41. CPU 12 may obtain density De1 of the candidate edge points in the area in step S305.

As depicted in FIG. 9, when detection area 40 includes a trailing edge of a first document 26 that may be skewed and a leading edge of a second document 26, the trailing edge of first document 26 may intersect the reading-start edge of detection area 40 at an intersection point 44. In this case, two edges may be detected based on candidate edge points detected on respective detection lines 41. That is, a straight line extending between the left edge of first document 26 and intersection point 44, e.g., a first edge 26B, and a straight line extending between an intersection point, at which a straight line extending from intersection point 44 along the sub-scanning direction and the leading edge of second document 26 are intersected, and the right edge of second document 26, may be obtained as the first edge. CPU 12 may regard a triangular area, which may have intersection point 44, as one of vertexes, of the two lines, e.g., the reading-start edge and first edge 26B, as a first area A1, and regard a tetragonal area, which may have intersection point 44 as one of vertexes and extend between the reading-start edge and first edge 26C, as a second area A2. That is, when the first edge consists of two substantially straight lines, CPU 12 may obtain a density of candidate edge points in an area located between the reading-start edge and each of the substantially straight lines constituting the first edge.

CPU 12 may determine whether density De1 of the candidate edge points is smaller than threshold value Dt specified in step S204 of FIG. 5 (step S306). When there are plurality of areas, e.g., first area A1 and second area A2, as described above, CPU 12 may compare values between density De1 of the candidate edge points in each area and threshold value Dt. The density of candidate edge points may be different between the read image obtained from the lower surface of document presser 32 and the read image obtained from document 26. In this embodiment, the density of candidate edge points in the read image obtained from document 26 may be higher than that in the read image obtained from the lower surface of document presser 32.

Therefore, when density De1 of the candidate edge points is smaller than threshold value Dt (step S306:YES), CPU 12 may determine that first area A1 is the read image obtained from the lower surface of document presser 32 but not obtained from document 26 as depicted in FIG. 8. Accordingly, the routine may move to step S304. CPU 12 may identify the first edge as leading edge 26A of document 26 that may be the detection target and exit the edge detecting process.

When density De1 of the candidate edge points is greater than or equal to threshold value Dt (step S306:NO), CPU 12 may identify the first edge as trailing edge 26B of first document 26. For example, as depicted in FIG. 9, CPU 12 may determine that first area A1 is a read image of document 26 and identify the first edge as trailing edge 26B of first document 26. In this case, CPU 12 may detect a second edge by further searching for candidate edge points on respective detection lines 41 from the first edge (trailing edge 26B) to a reading-end edge of detection area 40 and performing linear approximation on the detected candidate edge points (step S307). In the case depicted in FIG. 9, CPU 12 may re-search for candidate edge points on only respective detection lines 41 on which the candidate edge points of the first edge (trailing edge 26B) were detected. Then, CPU 12 may detect a second edge by performing approximation on the candidate edge points found in the first search (the candidate edge points representing another straight line (leading edge 26C of second document 26) constituting the first edge) and the candidate edge points newly found in the second search.

Then, CPU 12 may obtain a density De2 of the candidate edge points in a third area A3 extending between the first edge (trailing edge 26B) and the second edge (step S308). CPU 12 may determine whether obtained density De2 of the candidate edge points is smaller than threshold value Dt (step S309). When density De2 of the candidate edge points is smaller than threshold value Dt (step S309:YES), CPU 12 may determine that third area A3 is the read image obtained from the lower surface of document presser 32. Therefore, CPU 12 may identify the second edge as leading edge 26C of second document 26 that may be the detection target (step S310) and exit the edge detecting process.

When density De2 of the candidate edge points is greater than or equal to threshold value Dt (step S309:NO), CPU 12 may determine that some problem has occurred during edge detection. Accordingly, CPU 12 may notify the user of occurrence of an error by displaying a message on display unit 38 (step S115 in FIG. 4). The message may indicate that the edge detection failed. Then, CPU 12 may allow ADF 19 to stop conveying document 26 (step S116) and exit the ADF reading process.

When the number of steps of pulse signals has reached the second step-count before R sensor is turned on again after R sensor 36 was turned off in step S110 of FIG. 4 (step S110: YES), CPU 12 may complete the reading of one page of document 26 (step S117) and perform the flag setting process (step S118).

CPU 12 may determine whether F sensor 35 is on (step S119). When F sensor 35 is on, i.e., when a following document 26 exists (step S119:YES), CPU 12 may determine whether R sensor 36 is on (step S120). When R sensor 36 is not on (step S120:NO), the routine may wait until R sensor 36 is turned on. When R sensor 36 is turned on by following document 26 reached the location of R sensor 36 (step S120: YES), the routine may move back to step S105 of FIG. 3 and CPU 12 may repeat the subsequent steps.

When F sensor 35 is not on, i.e., when a following document 26 does not exit (step S119:NO), CPU 12 may allow ADF 19 to stop conveying document 26 (step S116) and exit the ADF reading process.

After ending the ADF reading process, CPU 12 may obtain a tilt angle of document 26 from the position of the edge detected with respect to each document 26 and correct the skewing of documents 26 in the read data. Then, CPU 12 may convert the corrected read data into data in a predetermined file format and store the converted data in NVRAM 15, for example.

According to the above-described embodiment, CPU 12 may detect the first edge based on the positions of the candidate edge points detected on the respective detection lines (step S302). Then, CPU 12 may obtain density De1 of the candidate edge points extracted as the feature points from first area A1 located on the reading-start side with respect to the first edge (step S305). CPU 12 may identify the first edge as a document leading edge or a document trailing edge (step S304) based on the results of the comparison between density De1 and threshold value Dt.

The process for detecting the candidate edge points may serve as the process for extracting the feature points, thereby requiring shorter time period than a case where these processes are performed separately.

When the first edge is not the detection target (step S306: NO), CPU 12 may re-detect candidate edge points in an area located on the reading-end side with respect to the first edge and detect a second edge based on positions of the detected candidate edge points (step S307). With this configuration, when the first edge is not the detection target, another edge may be detected.

When CPU 12 detects two different edges with respect to the main-scanning direction, CPU 12 may identify one edge located on the reading-start side with respect to the sub-scanning direction as a first edge and the other edge located on the reading-end side with respect to the sub-scanning direction as a part of a second edge. Accordingly, CPU 12 may detect the two edges effectively.

Further, CPU 12 may obtain density De2 of the candidate edge points extracted as the feature points from second area A2 extending between the first edge and the second edge (step S308). CPU 12 may identify the second edge as a document leading edge or a document trailing edge (step S310) based on the result of the comparison between density De2 and threshold value Dt (step S309). With this configuration, when the first edge is not the detection target, CPU 12 may surely detect the edge of the detection target.

CPU 12 may extract candidate edge points as the feature points in the read data generated by reading unit 18 that performed reading while a document 26 was absent at reading position P (step S202) and obtain a density of the candidate edge points in the area (step S203). CPU 12 may specify threshold value Dt based on the obtained density (step S204). With this configuration, CPU 12 may specify an appropriate threshold value in accordance with the dirt level, i.e., how much contaminants or dirt adhere to platen glass 27 or the lower surface of document presser 32, or the age-deterioration level in reading unit 18. Therefore, the accuracy of the determination may be maintained.

CPU 12 may notify the user of the result of the identification of the edge, which was detected based on the density of the feature points, as a document leading edge or a document trailing edge (step S115). Accordingly, for example, when a detection target edge is not detected, the user may provide an instruction to perform a reading operation again.

CPU 12 may obtain the distance between documents (step S401). When the distance between documents is smaller than the predetermined value (step S402:YES), CPU 12 may identify the detected edge as a document leading edge or a document trailing edge (step S303:YES). When the distance between documents is smaller than the predetermined value, the read data may highly include edges of a plurality of documents 26. Accordingly, the edge identification may be effective in such a case.

While the invention has been described in detail with reference to the specific embodiments thereof, it would be apparent to those skilled in the art that various changes, arrangements and modifications may be applied therein without departing from the spirit and scope of the invention.

In the above-described embodiments, the one or more aspects of the disclosure may be applied to the image-reading device. Nevertheless, in other embodiments, for example, the one or more aspects of the disclosure may be applied to multifunction peripheral devices having one or more of a printing function and a facsimile communication function as well as the reading function, and may also be applied to terminal devices.

Figure 10:
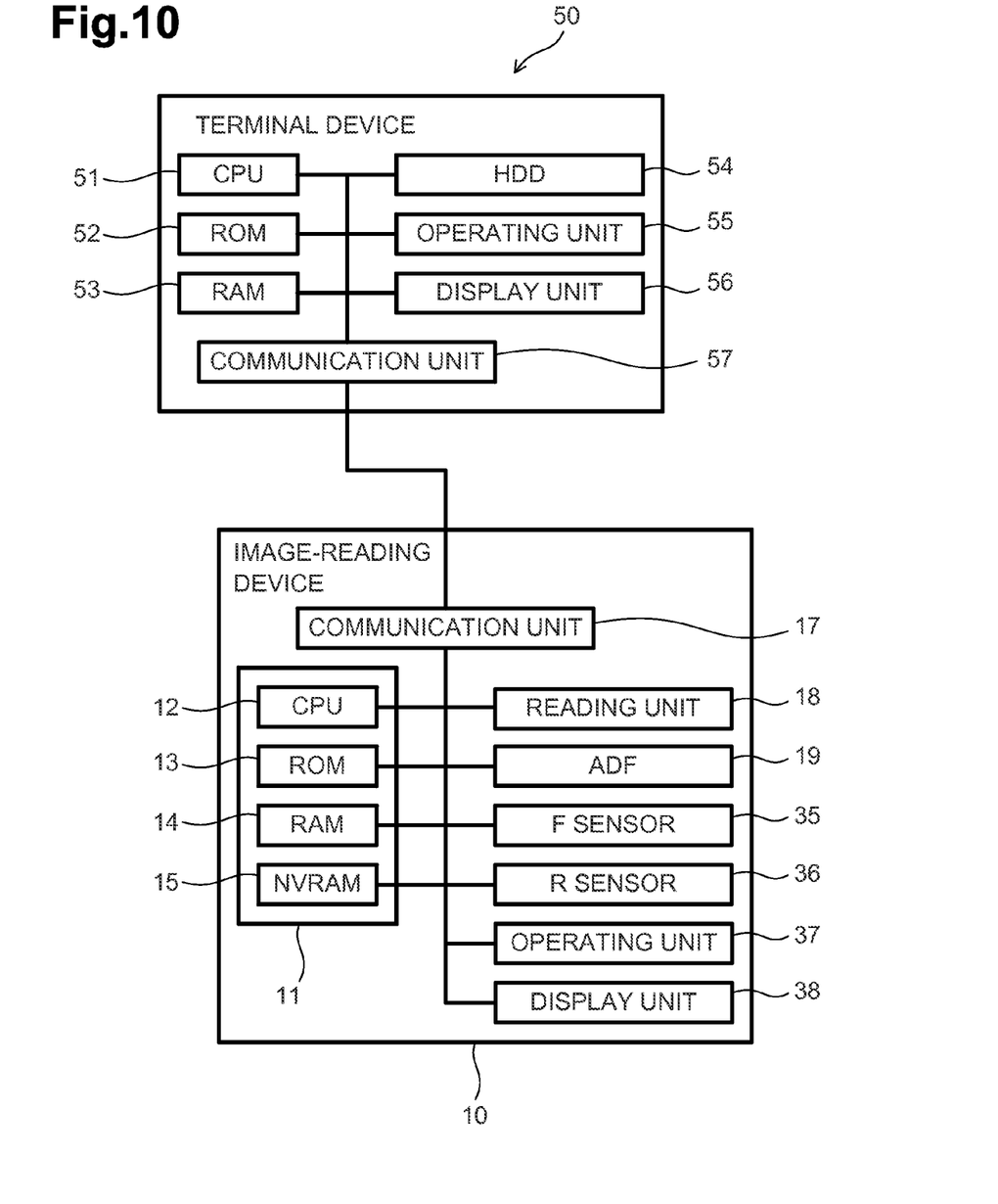
FIG. 10 is a schematic block diagram depicting an electric configuration of an image-reading device and a terminal device in another embodiment according to one or more aspects of the disclosure.

One or more aspects of another embodiment of the disclosure are described with reference to FIG. 10. A terminal device 50 may be a general-purpose computer and may comprise a CPU 51, a ROM 52, a RAM 53, a HDD 54, an operating unit 55, a display unit 56, and a communicating unit 57. HDD 54 may store an operating system ("OS"), a scanner driver, and programs for performing the edge detecting process. Communicating unit 57 may be an interface, e.g., USB or LAN, and may be connected with image-reading device 10.

When the user selects an execution of reading on operating unit 55 after placing one or more documents 26 on ADF 19 in image-reading device 10, CPU 51 of terminal device 50 may send a reading execution instruction to image-reading device 10 via communicating unit 57. Upon receipt of the reading execution instruction, CPU 12 of image-reading device 10 may send read data obtained by reading each document 26 by reading unit 18 to terminal device 50. Upon receipt of the read data, CPU 51 of terminal device 50 may detect a tile angle of each document 26 by performing a process generally corresponding to the edge detecting process of FIG. 6 and correct the read data.

In the above-described embodiments, the candidate edge points may be extracted as the feature points. Nevertheless, in other embodiments, for example, other points may be extracted as feature points, instead of the candidate edge points. A pixel whose pixel value may be greater than or equal to a predetermined threshold value may be extracted as the feature point. CPU 12 may compare a density of the feature points with a threshold value and identify an edge is a document leading edge or a document trailing edge.

The detailed steps included in the ADF reading process may be only an example of the aspects of the disclosure. The steps may be omitted, added or changed appropriately as necessary. For example, the threshold value specifying process of FIG. 5 may be omitted to use a fixed value. The flag setting process of FIG. 7 may be omitted. In this case, the density determination execution flag may be always on to perform the density determination every time.

The steps for detecting the second edge (steps S307-S310) may be omitted. For example, when density De1 of the candidate edge points of first area A1 is greater than or equal to threshold value Dt (step S360:NO), CPU 12 may store a page number of a document 26 having an edge of the detection target at the time in RAM 14. When there is one or more page numbers of documents 26 whose edges have not been detected in RAM 14 at the end of the ADF reading process, CPU 12 may notify the user of the one or more page numbers of documents 26 whose edges have not been detected by displaying the one or more page numbers on display unit 38.

In FIG. 6, when CPU 12 detected the second edge in step S307 by omitting steps S308 and S309, CPU may identify the second edge as the detection target in step S310.

In the above-described embodiments, the detection target may be a leading edge of a document 26. Nevertheless, in other embodiments, for example, the detection target may be a trailing edge of a document 26.

When CPU 12 succeeded the edge detection, CPU 12 may notify the user of success in the edge detection.

In the above-described embodiment, single CPU 12 may perform all of the processes. Nevertheless, the invention may not be limited to the specific embodiment thereof, and a plurality of CPUs, a special application specific integrated circuit ("ASIC"), or a combination of a CPU and an ASIC may be used to perform the processes.

What is claimed is:

1. An image-reading device comprising:
a conveyor configured to convey one or more documents to a reading position;
a reading unit configured to generate read data by reading, along a main-scanning direction at the reading position, the one or more documents that are being conveyed along a sub-scanning direction by the conveyor; and
a control device configured to:
detect candidate edge points in the read data, the detection being performed along a plurality of respective detection lines extending along the sub-scanning direction, the detection being performed from one end to the other end of each of the detection lines;
determine a first edge based on locations of candidate edge points indicating an edge of the document;
extract feature points from an area located on a one-end side with respect to the first edge in the read data;
obtain a density of the extracted feature points,
compare the obtained density and a threshold value,
obtain a distance between a first document and a second document that are successively conveyed by the conveyor, and
when the distance is smaller than a predetermined value, identify the first edge as a detection target edge based on the comparison result.

2. The image-reading device according to claim 1, wherein the control device is further configured to identify the first edge as a document leading edge based on the comparison result.

3. The image-reading device according to claim 1, wherein the control device is further configured to identify the first edge as a document trailing edge based on the comparison result.

4. The image-reading device according to claim 1, wherein the control device is further configured to extract the detected candidate edge points as the feature points.

5. The image-reading device according to claim 1, wherein the control device is further configured to:
re-detect candidate edge points along the plurality of respective detection lines in an area located on the other-end side with respect to the first edge when the first edge has been identified not to be the detection target edge, and
determine a second edge based on locations of candidate edge points newly detected by re-detecting the candidate edge points.

6. The image-reading device according to claim 5, wherein the control device is further configured to, when two different edges are determined with respect to the main-scanning direction, determine one of the two different edges located on the one-end side with respect to the sub-scanning direction as the first edge and the other located on the other-end side with respect to the sub-scanning direction as a part of the second edge.

7. The image-reading device according to claim 5, wherein the control device is further configured to:
re-extract feature points in an area located between the first edge and the second edge when the first edge has been identified not to be the detection target edge;
re-obtain a density of the re-extracted feature points;
re-compare the re-obtained density and the threshold value; and
re-identify the second edge as the detection target edge based on the comparison result of re-comparing the re-obtained density and the threshold value.

8. The image-reading device according to claim 1, wherein the control device is further configured to:
specify the threshold value based on a density of the feature points extracted from the read data generated by the reading unit that performed reading while a document is absent at the reading position.

9. The image-reading device according to claim 1, further comprising a notifying unit configured to notify of the result of the identifying process.

10. The image reading device according to claim 1,
wherein the reading unit further comprises an array of sensors,
wherein the candidate edge points are detected from read data from a subset of the array of sensors.

11. An image-reading device comprising:
a conveyor configured to convey one or more documents to a reading position;
a reading unit configured to generate read data by reading, along a main-scanning direction at the reading position, the one or more documents that are being conveyed along a sub-scanning direction by the conveyor; and
a control device configured to:
determine a first edge;
extract feature points from an area located between the first edge in the read data and a line across the read data parallel to the main-scanning direction where the line traverses data read before data relating to the first edge;
obtain a density of the extracted feature points,
compare the obtained density and a threshold value, and identify the first edge as a detection target edge based on the comparison result.

12. The image-reading device according to claim 11, wherein the control device is further configured to:
determine a second edge on an opposite side of the first edge from the line.

13. The image-reading device according to claim 12, wherein the control device is further configured to, when two different edges are determined with respect to the main-scanning direction, determine one of the two different edges located on the one-end side with respect to the sub-scanning direction as the first edge and the other located on the other-end side with respect to the sub-scanning direction as a part of the second edge.

14. The image-reading device according to claim 12, wherein the control device is further configured to:
re-extract feature points in an area located between the first edge and the second edge when the first edge has been identified not to be the detection target edge;
re-obtain a density of the re-extracted feature points;
re-compare the re-obtained density and the threshold value; and
re-identify the second edge as the detection target edge based on the comparison result of re-comparing the re-obtained density and the threshold value.

15. An image-reading device comprising:
a conveyor configured to convey one or more documents to a reading position;
a reading unit configured to generate read data by reading, along a main-scanning direction at the reading position, the one or more documents that are being conveyed along a sub-scanning direction by the conveyor; and
a control device configured to:
detect candidate edge points in the read data, the detection being performed along a plurality of respective detection lines extending along the sub-scanning direction, the detection being performed from one end to the other end of each of the detection lines;
determine a first edge based on locations of candidate edge points indicating an edge of the document;
extract feature points from an area located on a one-end side with respect to the first edge in the read data;
obtain a density of the extracted feature points;
compare the obtained density and a threshold value; and
identify the first edge as a document trailing edge based on the comparison result.

16. The image-reading device according to claim 15, wherein the control device is further configured to extract the detected candidate edge points as the feature points.

17. The image-reading device according to claim 15, wherein the control device is further configured to:
re-detect candidate edge points along the plurality of respective detection lines in an area located on the other-end side with respect to the first edge when the first edge has been identified not to be the detection target edge, and
determine a second edge based on locations of candidate edge points newly detected by re-detecting the candidate edge points.

18. The image-reading device according to claim 17, wherein the control device is further configured to, when two different edges are determined with respect to the main-scanning direction, determine one of the two different edges located on the one-end side with respect to the sub-scanning direction as the first edge and the other located on the other-end side with respect to the sub-scanning direction as a part of the second edge.

19. The image-reading device according to claim 17, wherein the control device is further configured to:
re-extract feature points in an area located between the first edge and the second edge when the first edge has been identified not to be the detection target edge;
re-obtain a density of the re-extracted feature points;
re-compare the re-obtained density and the threshold value; and
re-identify the second edge as the detection target edge based on the comparison result of re-comparing the re-obtained density and the threshold value.

20. The image-reading device according to claim 15, wherein the control device is further configured to:
specify the threshold value based on a density of the feature points extracted from the read data generated by the reading unit that performed reading while a document is absent at the reading position.

21. The image-reading device according to claim 15, further comprising a notifying unit configured to notify of the result of the identifying process.

22. The image reading device according to claim 15,
wherein the reading unit further comprises an array of sensors,
wherein the candidate edge points are detected from read data from a subset of the array of sensors.

* * * * *